(12) United States Patent
Caswell

(10) Patent No.: US 8,727,695 B2
(45) Date of Patent: May 20, 2014

(54) CHAMFER-FILLET GAP FOR THERMAL MANAGEMENT

(75) Inventor: Mark Owen Caswell, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1423 days.

(21) Appl. No.: 12/634,089

(22) Filed: Dec. 9, 2009

(65) Prior Publication Data
US 2011/0135450 A1    Jun. 9, 2011

(51) Int. Cl.
*F01D 25/14* (2006.01)
*F01D 11/24* (2006.01)

(52) U.S. Cl.
USPC ............. 415/1; 415/110; 415/115; 415/139

(58) Field of Classification Search
USPC ............ 415/1, 110–112, 115, 116, 139, 415/168.1–168.4, 170.1, 173.1, 173.7, 415/174.4, 174.5, 180, 229, 230; 416/1, 95, 416/198 A, 200 A, 201 R; 277/411–412, 421
See application file for complete search history.

(56) References Cited

U.S. PATENT DOCUMENTS

| | | | |
|---|---|---|---|
| 4,035,012 A * | 7/1977 | Guier | 294/90 |
| 4,484,858 A * | 11/1984 | Kurosawa et al. | 416/95 |
| 4,900,221 A * | 2/1990 | Ciokajlo et al. | 415/142 |
| 5,374,161 A | 12/1994 | Kelch et al. | |
| 5,609,469 A | 3/1997 | Worley et al. | |
| 6,393,331 B1 | 5/2002 | Chetta et al. | |
| 6,428,272 B1 * | 8/2002 | Pepi et al. | 416/96 R |
| 6,997,673 B2 | 2/2006 | Morris et al. | |
| 7,186,079 B2 * | 3/2007 | Suciu et al. | 415/199.5 |
| 7,534,187 B2 | 5/2009 | Donofrio et al. | |

(Continued)

OTHER PUBLICATIONS

Hohlfeld, Erik M., Film Cooling Predictions Along the Tip and Platform of a Turbine Blade, Part I, May 8, 2003, pp. 1-77.
Hohlfeld, Erik M., Geometry and Test Matrix, Chapter 3, Part II, pp. 56-128, May 8, 2003.

(Continued)

*Primary Examiner* — Edward Look
*Assistant Examiner* — Jesse Prager
(74) *Attorney, Agent, or Firm* — Krieg DeVault LLP

(57) ABSTRACT

An apparatus and method is disclosed herein in which a heat-transfer fluid can be directed through a gap defined between a fillet and a chamfer. The apparatus includes a first member having a body portion and a flange portion projecting from the body portion. The flange portion extends along an endless path encircling an axis to define a receiving aperture. A fillet is defined at a junction of the body portion and an inner surface of the flange portion. The apparatus also includes a second member having a plug portion receivable in the receiving aperture. The plug portion includes a first surface operable to abut the body portion and limit movement of the plug portion into the receiving aperture. The plug portion also includes a second surface slidably engageable with the inner surface of the flange portion to guide movement of the plug portion into the receiving aperture along the axis. A chamfer is defined at a junction of the first and second surfaces such that a gap is defined between the fillet and the chamfer when the plug portion is received in the receiving aperture. The apparatus also includes at least one passageway extending at least partially through at least one of the first member and the second member. The at least one passageway extends between the gap and an opening spaced from the gap. The at least one passageway is operable to receive a heat-transfer fluid to transfer heat relative to the fillet.

20 Claims, 3 Drawing Sheets

(56) References Cited

U.S. PATENT DOCUMENTS

| | | |
|---|---|---|
| 7,546,743 B2 | 6/2009 | Bulman et al. |
| 2006/0110255 A1* | 5/2006 | Itzel et al. ............... 416/193 A |
| 2009/0208339 A1 | 8/2009 | Cherolis et al. |

OTHER PUBLICATIONS

Hohlfeld, Erik M., Tip Simulation Results, Chapter 5, Part III, pp. 129-196, May 8, 2003.

Hohlfeld, Erik M., Predictions of Platform Adiabatic Effectiveness, Chapter 6, Part IV, pp. 197-284, May 8, 2003.

* cited by examiner

CHAMFER-FILLET GAP FOR THERMAL MANAGEMENT

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of F33615-03-D-2357 awarded by the Department of Defense.

BACKGROUND OF THE INVENTION

1. Field of the Invention

The invention relates to turbine engines, such as to the interconnection between fan members and spacers along a centerline axis.

2. Description of Related Prior Art

U.S. Pat. No. 6,997,673 discloses a gas turbine high temperature turbine blade outer air seal assembly. The turbine shroud assembly disclosed by the '673 patent includes forward and aft hangers, an axisymmetric plenum assembly, ceramic shroud segments, ceramic spacers, and forward and aft rope seals. The plenum assembly supplies impingement cooling to the shroud and the hangers. The impingement cooling to the forward and aft hangers is controlled independently to improve blade tip clearance. The rope seals are radially inward from the hangers and reduce cooling flow leakage. The turbine shroud assembly can operate in a higher temperature environment using less cooling flow than the prior art.

SUMMARY OF THE INVENTION

In summary, the invention is an apparatus and method in which a heat-transfer fluid can be directed through a gap defined between a fillet and a chamfer. The apparatus includes a first member having a body portion and a flange portion projecting from the body portion. The flange portion extends along an endless path encircling an axis to define a receiving aperture. A fillet is defined at a junction of the body portion and an inner surface of the flange portion. The apparatus also includes a second member having a plug portion receivable in the receiving aperture. The plug portion includes a first surface operable to abut the body portion and limit movement of the plug portion into the receiving aperture. The plug portion also includes a second surface slidably engageable with the inner surface of the flange portion to guide movement of the plug portion into the receiving aperture along the axis. A chamfer is defined at a junction of the first and second surfaces such that a gap is defined between the fillet and the chamfer when the plug portion is received in the receiving aperture. The apparatus also includes at least one passageway extending at least partially through at least one of the first member and the second member. The at least one passageway extends between the gap and an opening spaced from the gap. The at least one passageway is operable to receive a heat-transfer fluid to transfer heat relative to the fillet.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF AN EXEMPLARY EMBODIMENT

The invention, as exemplified in the embodiment described below, can be applied to enhance the thermal separation of two components connected together and also to enhance cooling of both components. In the exemplary embodiment set forth below, a gap defined between a fillet on a first component and a chamfer on a second component can receive heat-transfer fluid. The fluid can be air or coolant or any other fluid suitable in view of the conditions of the operating environment. Passageways can be formed to direct heat-transfer fluid to the gap and also to direct heat-transfer fluid away from the gap.

Figure 1:
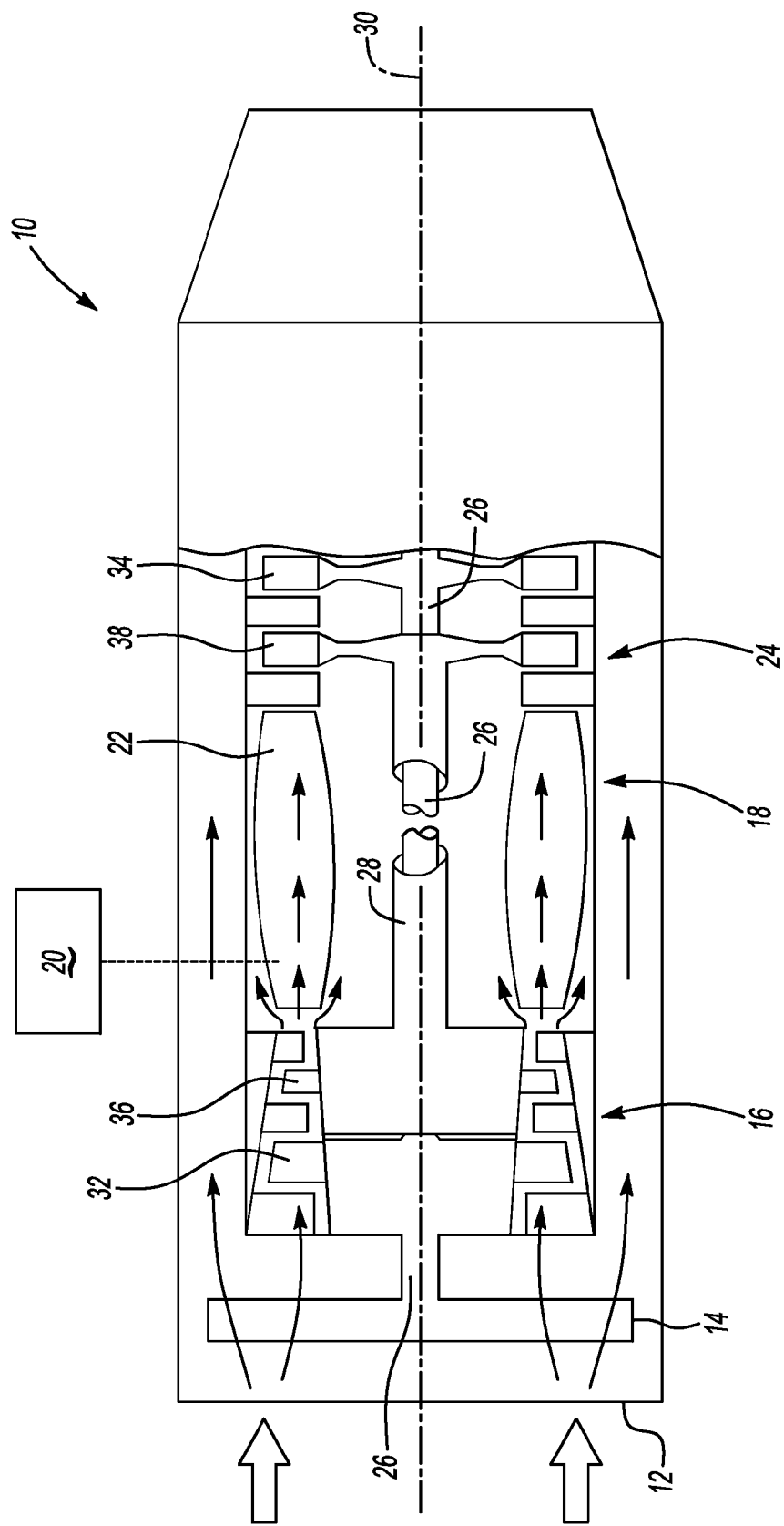
FIG. 1 is a schematic representation of a turbine engine incorporating a first exemplary embodiment of the invention.

FIG. 1 schematically shows a turbine engine 10. The various unnumbered arrows represent the flow of fluid through the turbine engine 10. The turbine engine 10 can produce power for several different kinds of applications, including vehicle propulsion and power generation, among others. The exemplary embodiment of the invention disclosed herein, as well as the broader invention, can be practiced in any configuration of turbine engine and for any application in which a chamfer and fillet confront one another and define a gap.

The exemplary turbine engine 10 can include an inlet 12 with a fan 14 to receive fluid such as air. Alternative embodiments of the invention may not include a fan. The turbine engine 10 can also include a compressor section 16 to receive the fluid from the inlet 12 and compress the fluid. The turbine engine 10 can also include a combustor section 18 to receive the compressed fluid from the compressor section 16. The compressed fluid can be mixed with fuel from a fuel system 20 and ignited in a combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24.

In FIG. 1, shafts 26, 28 are shown disposed for rotation about a centerline axis 30 of the turbine engine 10. Alternative embodiments of the invention can include any number of shafts. The shafts 26, 28 can be journaled together for relative rotation. The shaft 26 can be a low pressure shaft supporting compressor blades 32 of a low pressure portion of the compressor section 16. The shaft 26 can also support low pressure turbine blades 34 of a low pressure portion of the turbine section 24.

The shaft 28 encircles the shaft 26. Bearings can be disposed between the shafts 26, 28. The shaft 28 can be a high pressure shaft supporting compressor blades 36 of a high pressure portion of the compressor section 16. The shaft 28 can also support high pressure turbine blades 38 of a high pressure portion of the turbine section 24.

FIG. 1 shows a turbine schematically. The compressor blades 32 and 36 can be part of a row of blades encircling the axis 30. The blades 32, 36 of each row can be parts of a bladed disk assembly also including a disk or hub. For example, the disk or hub can define a plurality of slots and each of the plurality of blades can be received in one of the slots. A bladed disk assembly is a fan in that the structure rotates and urges air along the axis 30. Alternatively, embodiments of the invention can be practiced with a blisk wherein the hub and blades are integrally formed and unitary.

Figure 2:
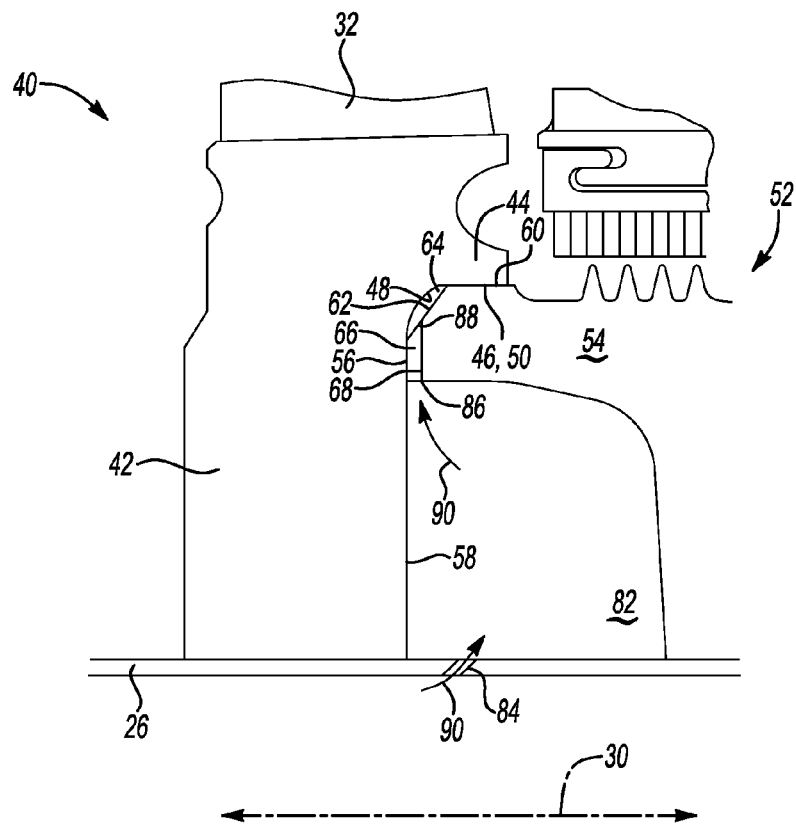
FIG. 2 is a detailed view showing a first cross-section of the structures shown schematically in FIG. 1.

FIG. 2 is a detailed view showing a cross-section of the structures shown schematically in FIG. 1. A fan 40 is a blisk and is an exemplary first member 40. The first member 40 includes a body portion 42. The exemplary body portion 42 is a hub or disk portion of the blisk. The body portion 42 can be engaged to rotate with the shaft 26 about the centerline axis 30. The body portion 42 extends radially from the centerline axis 30. The exemplary body 42 extends perpendicular to the axis 30, but could extend oblique to the axis 30 in alternative embodiments of the invention. It is also noted that the invention can be practiced through embodiments that do not rotate.

The first member 40 also includes a flange portion 44 projecting from the body portion 42 along the centerline axis 30. The flange portion 44 extends along an endless path encircling the centerline axis 30. The endless path can be circular, such as in the exemplary embodiment, but the endless path can take other forms in alternative embodiments of the invention. The flange portion 44 defines a receiving aperture 46. The receiving aperture 46 can be circular, rectangular, or any other shape. A fillet 48 is defined at a junction of the body portion 42 and an inner surface 50 of the flange portion 44. The inner surface 50 defines the receiving aperture 46.

A spacer 52 is an exemplary second member. Generally, a spacer can be positioned between blisks or bladed disk assemblies along the centerline axis 30. The second member 52 can be engaged to rotate with the shaft 26 about the centerline axis 30. The second member 52 can be operable to maintain the first member 40 a predetermined distance from another fan, such as the fan associated with blades 36 (shown in FIG. 1).

The second member 52 includes a plug portion 54 receivable in the receiving aperture 46. The plug portion 54 includes a first surface 56 operable to abut the body portion 42 and limit movement of the plug portion 54 into the receiving aperture 46. In the exemplary embodiment, the plug portion 54 can be inserted into the receiving aperture 46 until the first surface 56 contacts a surface 58 defined by the body portion 42.

The plug portion 54 also includes a second surface 60 slidably engageable with the inner surface 50 of the flange portion 44 to guide movement of the plug portion 54 into the receiving aperture 46 along the axis 30. A chamfer 62 is defined at a junction of the first and second surfaces 56, 60. A gap 64 is defined between the fillet 48 and the chamfer 62 when the plug portion 54 is received in the receiving aperture 46. A cross-section of the gap 64 at various positions about the centerline axis 30 can be defined in planes containing the fillet 48, the chamfer 62, and the centerline axis 30.

The apparatus also includes at least one passageway extending at least partially through at least one of the first member 40 and the second member 52 between the gap 64 and an opening or entry port spaced from the gap 64. The at least one passageway is operable to receive a heat-transfer fluid to transfer heat relative to the fillet 48. In the exemplary embodiment, the heat-transfer fluid can be used to cool the first member and the second member, especially the fillet 48 which can be a high stress area requiring mechanical properties associated with lower temperatures. Targeted cooling of the fillet-to-chamfer gap 64 can also serve to thermally isolate the first and second members 40, 52 from each other.

Figure 4:
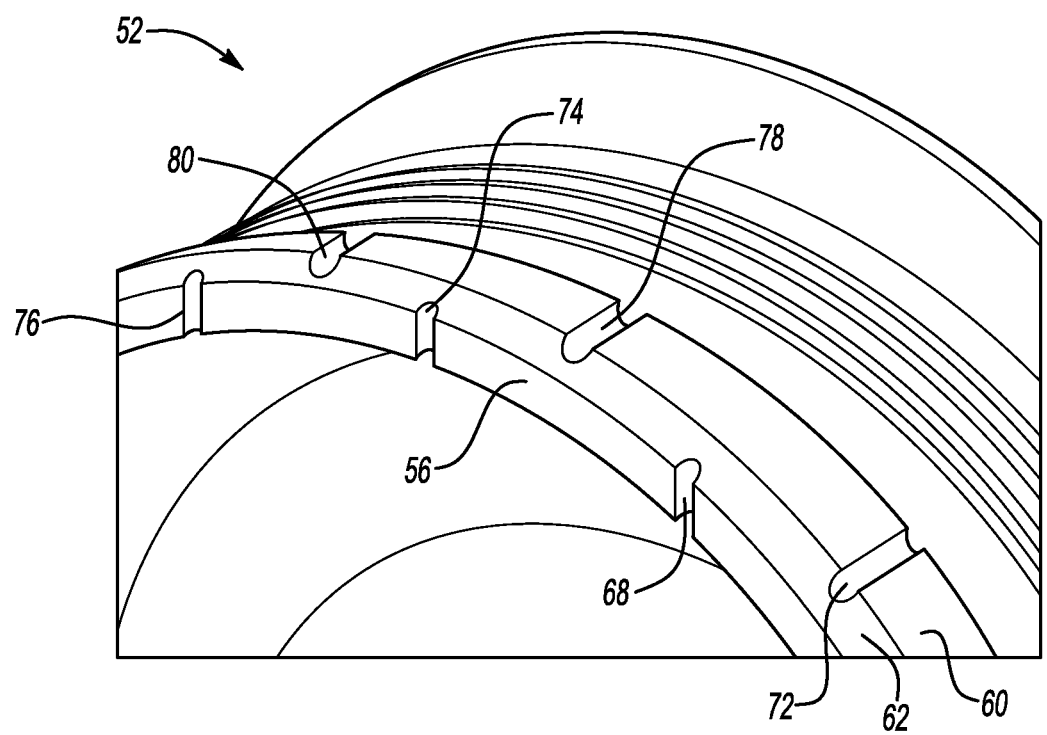
FIG. 4 is a partial perspective view of a spacer shown in cross-section in FIGS. 2 and 3.

In the exemplary embodiment, a passageway 66 can be defined by a channel portion 68 and the surface 58. The channel portion 68 can be a notch in the surface 56 of the second member 52. When the plug portion 54 is received in the receiving aperture 46 and the surfaces 56, 58 abut one another, the surface 58 can close the top of the channel portion 68. FIG. 4 is a partial perspective view of the spacer 52 and shows the spatial relationships in the exemplary embodiment of the invention between the channel 68, the surfaces 56 and 60, and the chamfer 62.

It is noted that a passageway in embodiments of the invention can be defined by only one of the first and second members. For example, a passageway could extend to the gap 64 through only the second member 52. It is also noted that a passageway in embodiments of the invention can include a first portion defined by only one of the first and second members and a second portion defined by both of the first and second members. In the exemplary embodiment, the form of the passageway 66 can be desirable since both the first and second members 40, 42 can be cooled and the first and second members 40, 42 can be more thermally-isolated from one another.

Figure 3:
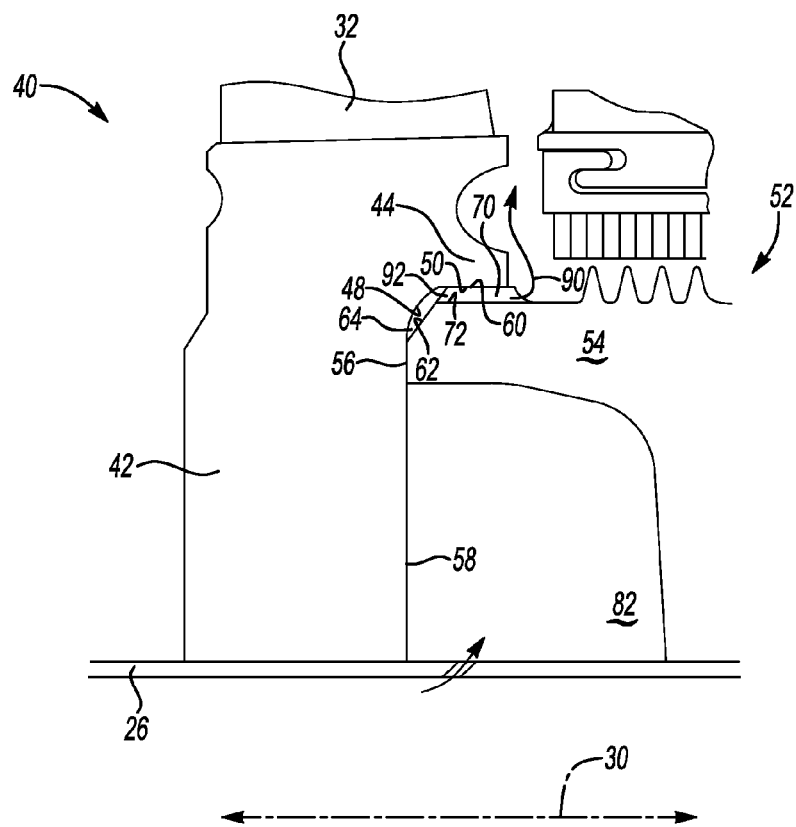
FIG. 3 is a detailed view showing a second cross-section of the structures shown schematically in FIG. 1.

Referring now to FIG. 3, the exemplary embodiment can also include a second passageway 70. The passageway 70 can be defined by a channel portion 72 and the inner surface 50. The channel portion 72 can be a notch in the surface 60 of the second member 52. When the plug portion 54 is received in the receiving aperture 46 and the surfaces 50, 60 abut one another, the surface 50 can close the top of the channel portion 72. FIG. 4 shows the spatial relationship in the exemplary embodiment of the invention between the channel 72, the surface 60, and the chamfer 62.

The exemplary embodiment can include a plurality of passageways analogous to passageway 66 shown in FIG. 2. FIG. 4 shows a plurality of channel portions 68, 74, 76. Each channel portion 68, 74, 76 can cooperate with the surface 58 (shown in FIG. 2) to define an individual passageway.

The exemplary embodiment can include a plurality of passageways analogous to passageway 70 shown in FIG. 3. FIG. 4 shows a plurality of channel portions 72, 78, 80. Each channel portion 72, 78, 80 can cooperate with the surface 50 (shown in FIG. 3) to define an individual passageway.

The passageways corresponding to the channel portions 68, 74, 76 can be spaced from the passageways corresponding to the channel portions 72, 78, 80 about the axis 30 (shown in FIGS. 1-3). Also, the passageways corresponding to the channel portions 68, 74, 76 can be transverse to the passageways corresponding to the channel portions 72, 78, 80. For example, the passageways corresponding to the channel portions 68, 74, 76 can be substantially perpendicular to the axis 30 while the passageways corresponding to the channel portions 72, 78, 80 can be substantially parallel to the axis 30.

Referring again to FIG. 2, a fluid such as air can be directed through the shaft 26 and into a substantially enclosed chamber 82. The air can pass through an aperture or slot 84 in the shaft 26 and the chamber 82 can be defined between the shaft 26, the first member 40, and the second member 52. An opening 86 of the passageway 66 can be spaced from the gap 64 and positioned in the chamber 82. The air can pass from the shaft 26, through the chamber 82, and into the passageway 66. The interior of the shaft 26 thus defines a third passageway and the aperture 84 defines a third opening. The exemplary third opening is thus positioned in the substantially enclosed chamber 82 and spaced from the first opening 86.

The air can pass through an exit 88 of the passageway 66 and be received in the gap 64. It is noted that the air can similarly reach the gap 64 through passageways corresponding to the channel portions 74 and 76 in FIG. 4. The flow of air is represented by arrows 90 in the drawings.

Referring again to FIG. 3, the air can escape the gap 64 through the passageway 70. The second passageway 70 includes a second opening 92 positioned remote from the substantially enclosed chamber 82. The passageways 66, 70 thus communicate with opposite sides of the cross-section of the gap 64. Further, the passageways 66, 70 can be spaced from one another, arranged in alternating relationship, about the axis 30 to maximize the distance the air travels through the gap 64. Also, the exemplary gap 64 can extend along an endless path around the axis 30 and thus the air can extract heat from a 360° periphery of the first member 40.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. An apparatus comprising:
   a first member having a body portion and a flange portion projecting from said body portion and extending along an endless path encircling an axis to define a receiving aperture, wherein a fillet is defined at a junction of said body portion and an inner surface of said flange portion;
   a second member having a plug portion receivable in said receiving aperture with a first surface operable to abut said body portion and limit movement of said plug portion into said receiving aperture and a second surface slidably engageable with said inner surface of said flange portion to guide movement of said plug portion into said receiving aperture along said axis, wherein a chamfer is defined at a junction of said first and second surfaces such that a gap is defined between said fillet and said chamfer when said plug portion is received in said receiving aperture; and
   at least one passageway extending at least partially through at least one of said first member and said second member between said gap and an opening spaced from said gap, said at least one passageway operable to receive a heat-transfer fluid to transfer heat relative to said fillet;
   wherein said at least one passageway further comprises: first and second passageways spaced from one another about said axis, wherein the first passageway is in fluid communication with one side of a cross-section of the gap and the second passageway is in fluid communication with an opposite side of the cross-section of the gap.

2. The apparatus of claim 1 wherein said at least one passageway further comprises: a channel portion defined by a notch in one of said first and second members, wherein a top of said channel portion is enclosed by a surface defined by the other of said first and second members.

3. The apparatus of claim 1 wherein said first and second passageways are spaced from one another about said axis, such that said first passageway is operable to direct heat-transfer fluid to said gap and said second passageway is operable to direct heat-transfer fluid away from said gap.

4. The apparatus of claim 1 wherein at least part of both of said first and second passageways are formed in one of said first and second members.

5. The apparatus of claim 1 wherein each of said first and second passageways is further defined as: a channel portion defined by a notch in one of said first and second members; and a flat surface defined by the other of said first and second members and enclosing said channel portion.

6. The apparatus of claim 5 wherein said flat surfaces respectively enclosing said first and second passageways are both defined by the same one of the first and second members.

7. The apparatus of claim 1 wherein said first and second passageways are further defined as transverse to one another.

8. The apparatus of claim 7 wherein said first passageway is substantially parallel to said axis and said second passageway is substantially perpendicular to said axis.

9. The apparatus of claim 1 wherein said plug portion is further defined as hollow and cooperates with said body portion to at least define a substantially enclosed chamber and wherein said opening of said at least one passageway is positioned in said substantially enclosed chamber.

10. The apparatus of claim 1 in which the second passageway includes a second opening positioned remote from said substantially enclosed chamber.

11. The apparatus of claim 10 further comprising: a third passageway having a third opening positioned in said substantially enclosed chamber and spaced from said first opening, said third passageway for directing heat-transfer fluid into said substantially enclosed chamber to be received by said first passageway.

12. The apparatus of claim 1 wherein said gap extends along an endless path around said axis.

13. The apparatus of claim 12 wherein said at least one passageway further comprises: a plurality of passageways spaced from one another about said axis along said endless path and extending substantially transverse to said axis.

14. A method comprising the steps of:
   interconnecting first and second structures together such that a fillet defined on one of the first and second structures and chamfer on the other of the first and second structures confront one another and define a gap between the first and second structures; and
   directing heat-transfer fluid in and out of the gap between the chamfer and the fillet to transfer heat relative to said fillet;
   wherein said directing step further comprises the step of:
   inputting fluid into the gap through a first plurality of passageways disposed about an axis and evacuating fluid from the gap through a second plurality of passageways spaced from the first plurality of passageways about the axis.

15. The method of claim 14 wherein said directing step further comprises the step of: inputting fluid into the gap through the first plurality of passageways in which each of the first plurality of passageways is disposed on a first side of the gap in a plane containing the fillet and the chamfer; and evacuating fluid from the gap through the second plurality of passageways in which each of the second plurality of passageways is disposed on a second side of the gap opposite the first side in the plane containing the fillet and the chamfer.

16. The method of claim 14 wherein said directing step further comprises the step of: arranging the first and second pluralities of passageways in alternating relationship along the gap.

17. A turbine engine comprising:
   a fan having a body portion extending radially from a centerline axis and a flange portion projecting from said body portion along said centerline axis and extending along a circular path encircling said centerline axis to define a receiving aperture, wherein a fillet is defined at a junction of said body portion and an inner surface of said flange portion;

a spacer disposed adjacent to said fan and having a plug portion receivable in said receiving aperture with a first surface operable to abut said body portion and limit movement of said plug portion into said receiving aperture and a second surface slidably engageable with said inner surface of said flange portion to guide movement of said plug portion into said receiving aperture along said axis, wherein a chamfer is defined at a junction of said first and second surfaces such that a gap is defined between said fillet and said chamfer when said plug portion is received in said receiving aperture;

at least one passageway extending at least partially through at least one of said fan and said spacer between said gap and an opening spaced from said gap, said at least one passageway operable to receive a heat-transfer fluid to transfer heat relative to said fillet.

18. The turbine engine of claim 17 further comprising:
a shaft rotatable about said centerline axis wherein said fan and said spacer are engaged to rotate with said shaft, said shaft and said fan and said spacer cooperating to define a substantially enclosed chamber and said shaft including at least one aperture open to said substantially enclosed chamber for communicating heat-transfer fluid from said shaft into said substantially enclosed chamber.

19. The turbine engine of claim 18 wherein said at least one passageway is further defined as a plurality of first channels defined in said spacer and extending radially relative to said centerline axis from respective first openings positioned in said substantially enclosed chamber to said gap, wherein respective tops of said plurality of first channels are closed by said body portion.

20. The turbine engine of claim 19 further comprising:
a plurality of second channels defined in said spacer extending along said centerline axis from respective second openings positioned at said gap to respective exits spaced from said gap, wherein respective tops of said plurality of second channels are closed by said inner surface.

* * * * *